Aug. 13, 1935.     J. CATARAU     2,010,976
ARTIFICIAL BAIT
Original Filed Sept. 11, 1934

Jules Catarau
INVENTOR

Patented Aug. 13, 1935

2,010,976

UNITED STATES PATENT OFFICE 2,010,976

ARTIFICIAL BAIT

Jules Catarau, Seattle, Wash.

Original application September 11, 1934, Serial No. 743,565. Divided and this application February 12, 1935, Serial No. 6,213

1 Claim. (Cl. 43—46)

This invention relates to artificial bait and resides in a novel construction of a lure body provided with scent oozing means, so as to add to the optical allure of artificial bait effects on olfactory sense of fish sought and is a division of application Serial No. 743,565, filed September 11, 1934.

The main object of the invention is to build on the body of an artificial bait a scent oozing means that will withstand the rough treatment usual in fishing for large species of fish like tuna, tarpon, marlin, etc.

A further aim is to build said scent oozing means on a lure body without marring the optical alluring effect of the same.

In the herewith annexed drawing the

Figure 1:
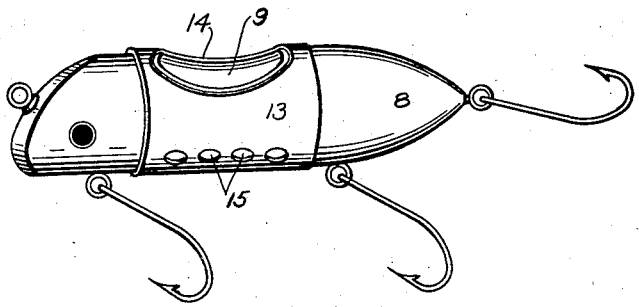
Figure 1 is a perspective view of a cigar-shaped lure-body provided with scent oozing means in accordance with the invention.

As plainly illustrated by the drawing, the lure-body 8 of an artificial bait having on its surface intermediate its ends a recessed portion 9 is provided with a tubular member 13. Said tubular member is snugly mounted on the lure-body to slide freely around the same as shown in Figures 1 and 2, or to slide forth and back as shown in Figures 3 and 4.

Figure 2:
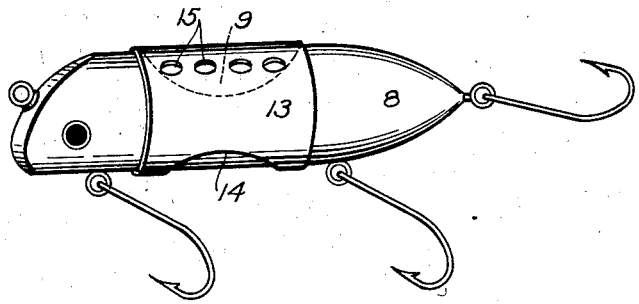
Figure 2 illustrates said scent oozing means in its closed position.
Figure 3:
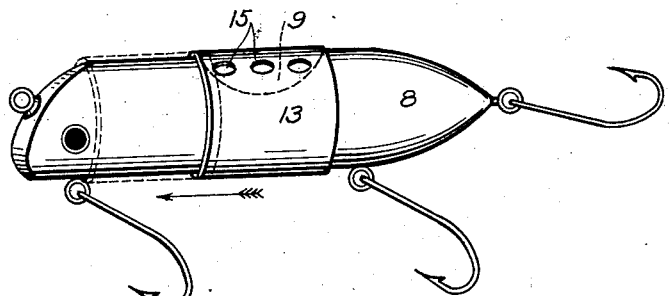
Figure 3 is a modified structure of said scent oozing means.

When the tubular member is mounted on a round shaped lure-body, as in Figures 1 and 2, an opening 14 is formed in the side of said tubular member to correspond to the periphery of the recessed portion 9 and thereby to permit free access into the scent container formed by co-action of the recessed portion and the tubular member.

In any case a plurality of openings 15 are formed through the wall of the tubular member to permit water to circulate in and out and to mix its molecules with bait emanations from within the container and thereby create an effluvium around the lure-body.

Figure 4:
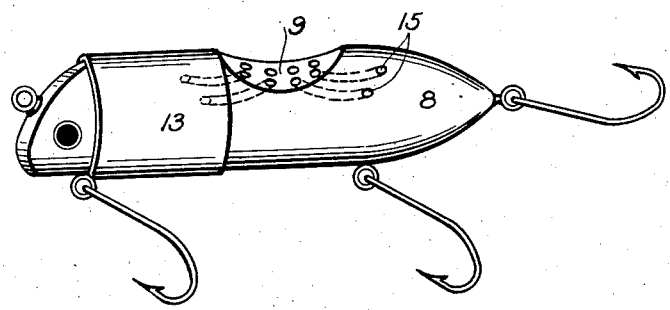
Figure 4 illustrates said modified scent oozing means in open position.

Said plurality of openings 15 may be dispensed with if the lure-body carries similar openings leading in and out as in Figure 4 for the purposes set hereinbefore.

What I claim as my invention is:

A lure-body having intermediate its ends a recessed portion to receive scent material, a tubular member snugly mounted on said lure-body to slide freely over the recessed portion to enclose the scent material, said tubular member being formed with a plurality of openings through its wall to facilitate the exudation of the scent material.

JULES CATARAU.